(12) United States Patent
    Onel et al.

(10) Patent No.:    US 12,630,336 B2
(45) Date of Patent:        May 19, 2026

(54) TAMPER RESISTANT CLIPS FOR MODULAR SHIPPING CONTAINER

(71) Applicant: Cryoport, Inc., Brentwood, TN (US)

(72) Inventors: Bobby Onel, Laguna Beach, CA (US); James Wilbourn, Costa Mesa, CA (US)

(73) Assignee: Cryoport, Inc., Brentwood, TN (US)

( * ) Notice: Subject to any disclaimer, the term of this patent is extended or adjusted under 35 U.S.C. 154(b) by 44 days.

(21) Appl. No.: 18/539,007

(22) Filed: Dec. 13, 2023

(65) Prior Publication Data

US 2025/0197061 A1     Jun. 19, 2025

(51) Int. Cl.
    B65D 43/02        (2006.01)
    A61J 9/00         (2006.01)
            (Continued)

(52) U.S. Cl.
    CPC ............... B65D 25/02 (2013.01); B65B 7/28 (2013.01); B65B 25/00 (2013.01); B65B 69/0033 (2013.01); B65D 81/3825 (2013.01); F25D 3/125 (2013.01); G06Q 10/0832 (2013.01); A61J 1/1412 (2013.01); B65D 2203/10 (2013.01)

(58) Field of Classification Search
    CPC ....... A01N 1/146; A01N 1/148; A61J 1/1412; B65B 7/28; B65B 69/0033; B65D 25/02; B65D 25/00; B65D 81/3825; B65D 2203/10; E05B 65/52; E05B 67/003; E05B 73/0005; E05B 73/00; F25D 3/125; G06Q 10/0832; Y10T 70/483; Y10T 70/5031; Y10T 70/5089; Y10T 70/489; Y10T 70/491

USPC ................ 70/58, 57.1, 63, 30, 49; 190/120; 220/592.2

See application file for complete search history.

(56)                References Cited

U.S. PATENT DOCUMENTS 4,488,624 A * 12/1984 Myers .................... A45C 13/20
                                                      70/49
4,733,840 A *  3/1988 D'Amore ............ E05B 73/0005
                                                     248/205.3

(Continued)

FOREIGN PATENT DOCUMENTS

JP      2002-145357 A      5/2002
JP      2005-335788 A      12/2005
WO      2006-086759 A2     8/2006

OTHER PUBLICATIONS

KIPO; International Search Report & Written Opinion dated Mar. 25, 2025 in PCT/US2024/059328.

*Primary Examiner* — Gideon R Weinerth
(74) *Attorney, Agent, or Firm* — Snell & Wilmer L.L.P.

(57)                ABSTRACT

A temperature-controlled shipper may comprise a temperature-controlled enclosure, a tray, an outer enclosure, and a lid, wherein the tray may be securely coupled to the temperature-controlled enclosure to resist tampering with a payload located in the temperature-controlled enclosure. The secure coupling of the temperature-controlled enclosure and the tray may be achieved using securely fastened or attached loops on both the temperature-controlled enclosure and the tray, wherein each tamper-resistant tie is secured after looping through one loop on the temperature-controlled enclosure and one loop on the tray to prevent access to the payload.

11 Claims, 7 Drawing Sheets

(51) Int. Cl.

| | |
|---|---|
| *A61J 9/08* | (2006.01) |
| *A61J 11/04* | (2006.01) |
| *B65B 7/28* | (2006.01) |
| *B65B 25/00* | (2006.01) |
| *B65B 69/00* | (2006.01) |
| *B65D 25/02* | (2006.01) |
| *B65D 81/38* | (2006.01) |
| *F25D 3/12* | (2006.01) |
| *G06Q 10/0832* | (2023.01) |
| *A61J 1/14* | (2023.01) |

(56) References Cited

U.S. PATENT DOCUMENTS

| | | | | |
|---|---|---|---|---|
| 5,595,073 | A * | 1/1997 | Sullivan | E05B 17/002 70/159 |
| 5,787,738 | A * | 8/1998 | Brandt | E05B 73/0005 70/58 |
| 5,787,739 | A * | 8/1998 | Derman | E05B 67/383 70/58 |
| 6,193,097 | B1 * | 2/2001 | Martin Perianes | B65D 81/3823 220/501 |
| 6,604,390 | B1 * | 8/2003 | Nooner | A47G 29/20 70/30 |
| 6,742,366 | B1 * | 6/2004 | Lai | E05B 67/003 70/30 |
| 7,540,451 | B2 * | 6/2009 | Leyden | F16L 3/1218 248/71 |
| 7,971,458 | B2 * | 7/2011 | Gilbert | E05B 73/0082 248/552 |
| 9,039,049 | B2 * | 5/2015 | Lahey | E05C 17/365 292/264 |
| 9,631,860 | B2 * | 4/2017 | Gossens | F25D 11/04 |
| 10,443,918 | B2 * | 10/2019 | Li | F25D 3/08 |
| 10,604,968 | B2 * | 3/2020 | Smith | E05C 21/00 |
| 12,474,104 | B2 * | 11/2025 | Bollinger | F25D 3/08 |
| 2004/0035157 | A1 * | 2/2004 | Petrick | E05B 73/0082 70/58 |
| 2006/0060588 | A1 | 3/2006 | Tonelli | |
| 2010/0102057 | A1 * | 4/2010 | Long | A45C 5/02 206/503 |
| 2011/0147540 | A1 * | 6/2011 | Rivara | F16L 3/137 403/345 |
| 2013/0077896 | A1 | 3/2013 | Wiley et al. | |
| 2014/0017659 | A1 * | 1/2014 | Steinman | A01N 1/148 435/284.1 |
| 2014/0169926 | A1 * | 6/2014 | Henderson | B65D 81/3834 414/800 |
| 2015/0375918 | A1 * | 12/2015 | Holderness | B67D 3/0067 220/592.2 |
| 2016/0268793 | A1 * | 9/2016 | Partridge | F16B 47/003 |
| 2020/0045959 | A1 * | 2/2020 | Hoffmann | A01N 1/148 |
| 2020/0253193 | A1 * | 8/2020 | Bryant | A61J 1/165 |
| 2021/0045563 | A1 | 2/2021 | Bartley-Clark | |
| 2021/0139225 | A1 * | 5/2021 | Morine | B65D 25/04 |
| 2022/0082317 | A1 * | 3/2022 | Bollinger | F25D 3/14 |
| 2024/0076117 | A1 | 3/2024 | Wallin | |
| 2024/0253870 | A1 * | 8/2024 | Luedke | F25D 3/08 |
| 2024/0344751 | A1 * | 10/2024 | Wilbourn | A01N 1/145 |
| 2025/0197061 | A1 * | 6/2025 | Onel | G06Q 10/0832 |
| 2025/0214761 | A1 * | 7/2025 | Lauro | B65D 81/3825 |
| 2025/0304320 | A1 * | 10/2025 | Wilbourn | B65D 81/113 |
| 2025/0380685 | A1 * | 12/2025 | Hil | A01N 1/148 |

* cited by examiner

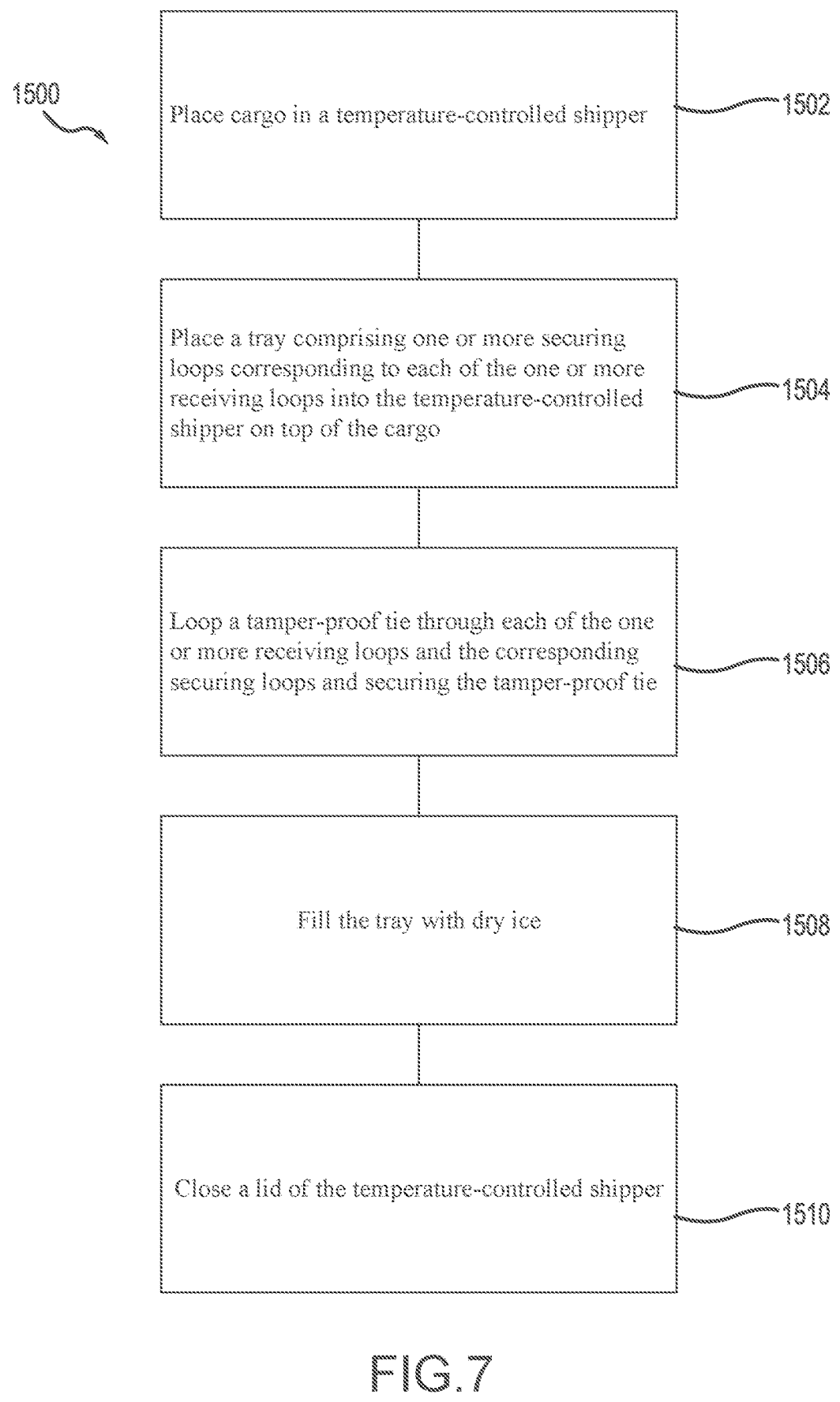

1500

| Place cargo in a temperature-controlled shipper | 1502 |

| Place a tray comprising one or more securing loops corresponding to each of the one or more receiving loops into the temperature-controlled shipper on top of the cargo | 1504 |

| Loop a tamper-proof tie through each of the one or more receiving loops and the corresponding securing loops and securing the tamper-proof tie | 1506 |

| Fill the tray with dry ice | 1508 |

| Close a lid of the temperature-controlled shipper | 1510 |

FIG.7

TAMPER RESISTANT CLIPS FOR MODULAR SHIPPING CONTAINER

FIELD

This specification relates to a system, apparatus, or method for cryogenically storing, transporting and/or shipping, particularly to tamper resistant clips for use on a modular shipping container.

DESCRIPTION OF THE RELATED ART

In the health, medical, pharmaceutical and/or life science industries, the safe storage of a payload in a temperature-controlled manner is important. Typically, when a payload is shipped, one packs the payload into a temperature-controlled enclosure, such as a plastic box, and may pack shipping material, such as a polystyrene foam container and/or dry ice, around the payload to maintain the temperature. One may place or scoop dry ice pellets or blocks into an inner packaging made of an insulating material, such as polystyrene foam, and around the payload to maintain the temperature of the payload. The inner packaging may be placed within an outer casing, such as a sturdy cardboard or plastic box, and the outer casing may be partially sealed. The temperature-controlled shipper can be opened and refilled with dry ice throughout the transport and delivery in order to maintain the temperature if the dry ice or other phase change material becomes depleted. The nature of the health, medical, pharmaceutical and/or life science industries requires that the payload within the shipper be protected from tampering during shipping, storage, or transport for the health and safety of those facilitating the transport and the end user of the payload, as well as the viability and usability of the payload.

Accordingly, there is a need for a system, apparatus or method to ameliorate potential tampering during storage, transportation, and shipping of the payload.

SUMMARY

A system and method for resisting or preventing tampering or interference with a temperature-controlled enclosure is disclosed herein.

In various embodiments, a temperature-controlled shipper may comprise a temperature-controlled enclosure, a tray, an outer casing, and a lid. The tray may be removeable and fit in the temperature-controlled enclosure on top of a payload. The payload may not be accessed unless the tray is removed. Thus, herein disclosed is a system of securing the tray to the temperature-controlled enclosure to resist tampering of the payload and indicate if any tampering has occurred.

In various embodiments, a tray is configured to fit into the temperature-controlled shipper and securely fasten to the temperature-controlled enclosure. In various embodiments, the fastening may be achieved using clips or tamper-resistant ties. In various embodiments, the tray may have one or more receiving loops, and the temperature-controlled enclosure may have one or more securing loops. The tamper-resistant ties may be configured to loop through one or more of the receiving loops and one or more of the securing loops before the tamper-resistant ties are secured. In various embodiments, the tamper-resistant ties may be metal zip ties configured to irreversibly secure the loop formed by the tamper-resistant ties. The tamper-resistant ties may be made of steel. The tamper-resistant ties may be serialized and barcoded. The tamper-resistant ties may have RFID capabilities. The tamper-resistant ties may be made of steel. In various embodiments, the tamper-resistant ties may comprise sensors that remotely alert a user if tampering has occurred or is occurring.

A method for secure cryogenic shipping is disclosed herein. In various embodiments, the method for secure cryogenic shipping comprises placing a payload in a temperature-controlled shipper, specifically in a temperature-controlled enclosure of the temperature-controlled shipper, placing a tray with one or more receiving loops coupled to the tray on top of the payload in the temperature-controlled shipper, looping one or more tamper-resistant ties through one securing loop and one receiving loop, wherein each securing loop is coupled to one receiving loop using a tamper-resistant tie and securing the tamper-resistant ties. In various embodiments, the tray is then filled with dry ice, and the lid is closed and secured. The temperature-controlled shipper may then be shipped or stored, and the payload may not be accessed without showing evidence of the access.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

FIG. 7 illustrates a method of using tamper-resistant ties with a temperature-controlled shipper to resist tampering with a payload in the temperature-controlled enclosure, in accordance with various embodiments.

DETAILED DESCRIPTION

Disclosed herein are systems, apparatuses, and devices for transporting and storing a payload in temperature-controlled conditions to resist tampering with a payload. The system, apparatus or device may include a temperature-controlled enclosure, a tray, an outer casing, and tamper-resistant ties. Particular embodiments of the subject matter described in this specification may be implemented to realize one or more of the following advantages.

In various embodiments, a temperature-controlled shipper may contain a temperature-controlled enclosure in which a payload may be enclosed during shipment or storage. The temperature-controlled enclosure may comprise one or more securing loops through which a tie may be securely inserted.

In various embodiments, a tray may fit into the temperature-controlled enclosure, wherein the tray comprises one or more receiving loops which are configured to securely insert a tamper-resistant tie. In various embodiments, one tamper-resistant tie may go through both a receiving loop and a securing loop before securely fastening the tamper-resistant tie. In various embodiments, a lid of the temperature-controlled shipper may further secure the payload when closed and also may insulate the temperature-controlled enclosure. In various embodiments, the tamper-resistant tie may only be undone using wire cutters or scissors. In various embodiments, once a tamper-resistant tie is undone, it will be evident to an observer that the tamper-resistant tie has been cut. Moreover, in various embodiments, any unauthorized attempt to cut or unsecure the tamper-resistant ties may trigger a signal that may be received by a user to alert of the tampering.

Figure 1:
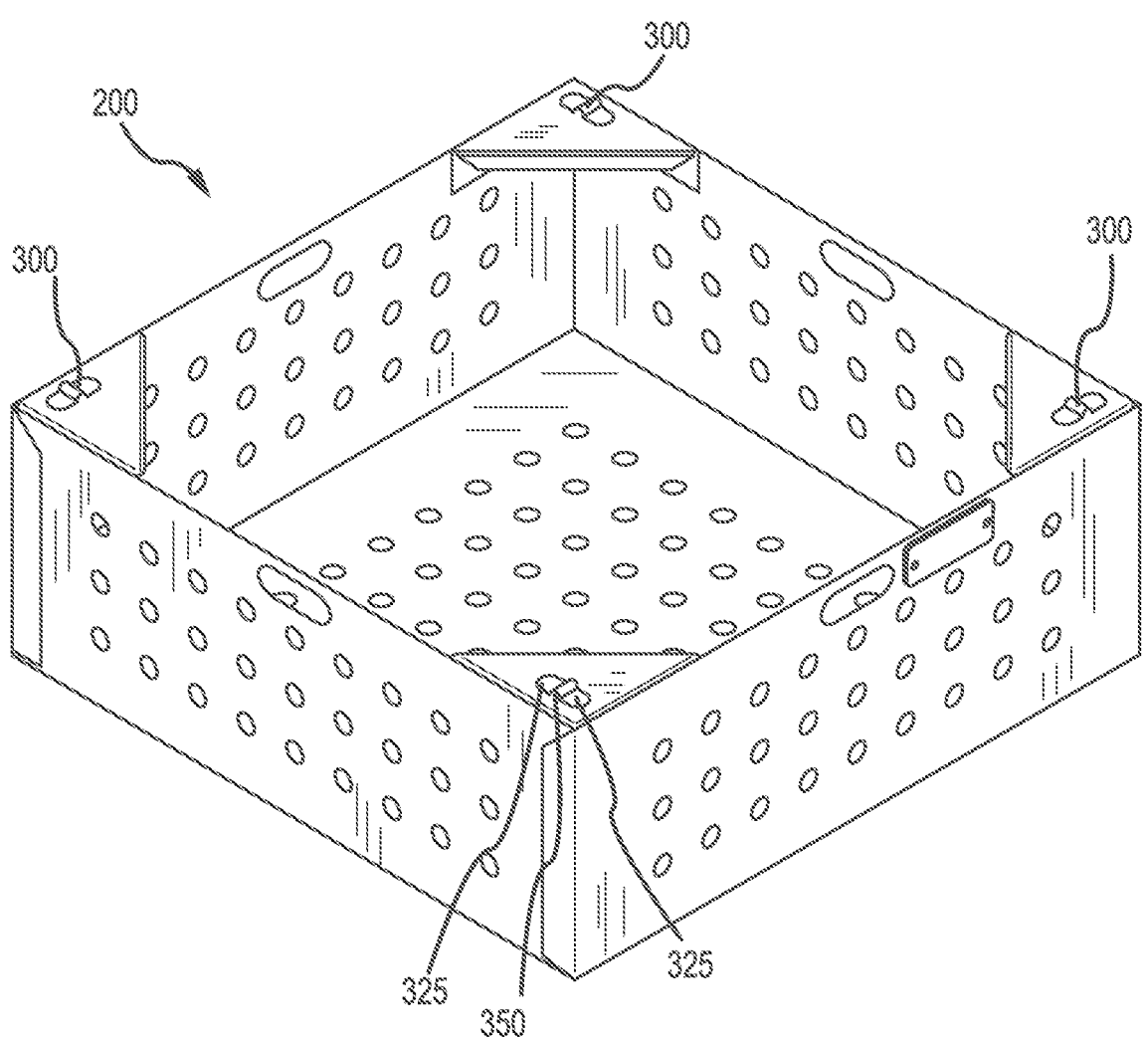
FIG. 1 illustrates a perspective view of a tray with four receiving loops coupled to the tray, in accordance with various embodiments.

Referring now to FIG. 1, a perspective view of tray 200 is illustrated, in accordance with various embodiments. The tray may be an open-faced rectangular box with perforated holes throughout its surface. The tray may be made of metal, plastic, or another material with properties that allow the tray to maintain its functionality under low-temperature conditions. In various embodiments, a plurality of receiving loops 300 may be coupled to the tray 200. The receiving loops 300 may each comprise one or more flange portions 375 and at least one passageway 350. The receiving loops 300 may be coupled to the tray using one or more welds 325, wherein the tray 200 and flange portions 375 are both metal, and each flange portion 375 is coupled to the tray using a weld 325.

Figure 2:
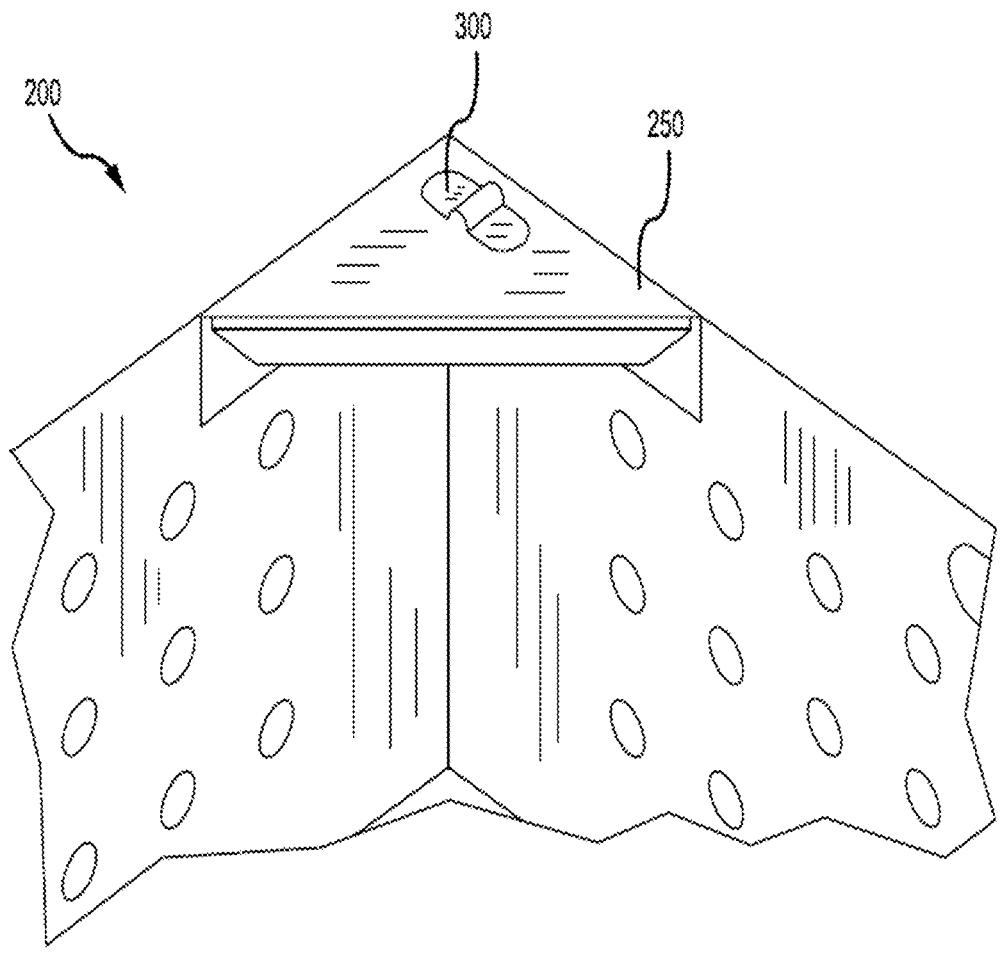
FIG. 2 illustrates a zoomed-in view of a receiving loop coupled to a corner of a tray, in accordance with various embodiments.

With reference to the combination of FIGS. 1 and 2, in various embodiments, the tray 200 has a corner flange 250 in each corner wherein a triangle-shaped surface is coupled to the tray 200. Each receiving loop 300 may be coupled to a corner flange 250. For example, with reference to FIG. 2, a corner flange 250 is illustrated at the corner of the tray 200. A receiving loop 300 is coupled to the corner flange 250 by a weld 325 at each of the flange portions 375 of the receiving loop 300.

However, the present disclosure is not limited in this regard, for example the receiving loops 300 could be attached to the tray 200 with screws or other fasteners, or could be made unitary with the tray 200 such as by punching and/or pressing features into the tray 200. In various embodiments, the receiving loops 200 may be slots in the tray 200 wherein the slot is configured to be the passageway 350.

Figure 3:
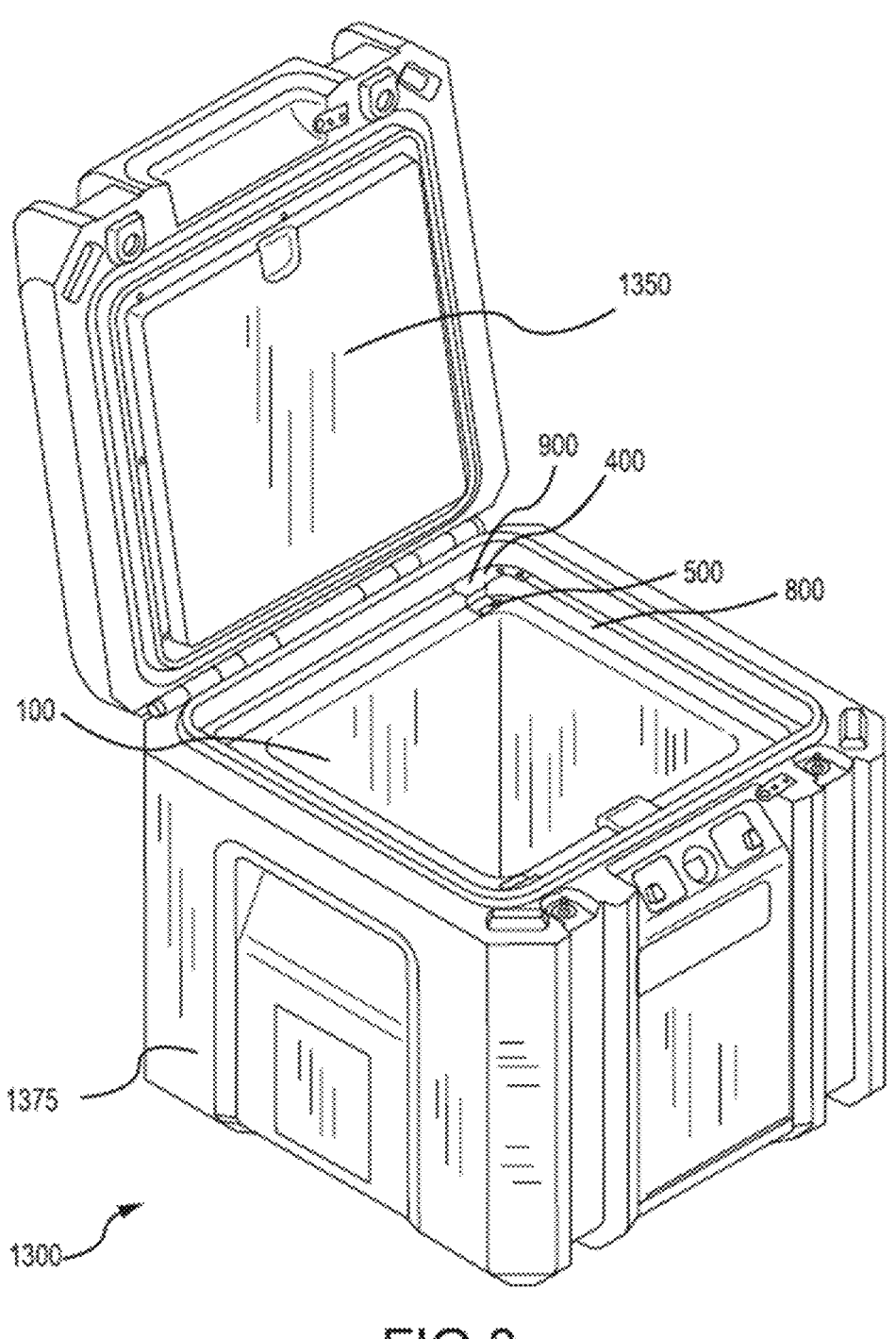
FIG. 3 illustrates a temperature-controlled shipper with two brackets coupled to the temperature-controlled enclosure, each bracket comprising a securing loop, in accordance with various embodiments.

Referring now to FIG. 3, in various embodiments, a bracket 400 may be coupled to the temperature-controlled enclosure 100 in a temperature-controlled shipper 1300. The bracket may be made of steel or another suitable material. With reference to FIG. 3, a temperature-controlled shipper 1300 is illustrated, comprising a lid 1350, an outer casing 1375, and a temperature-controlled enclosure 100. Although the temperature-controlled shipper 1300 is illustrated as a cube-shaped, the temperature-controlled shipper 1300 may be any three-dimensional shape, for example, a rectangular prism, pyramid, or spherical shape. The temperature-controlled enclosure may be configured to receive and store the payload for storage or shipping. The temperature-controlled enclosure 100 comprises an outer rim 800, which may be a flat surface on top of the walls of the temperature-controlled enclosure at or adjacent to the location at which the temperature-controlled enclosure 100 makes contact with the outer casing 1375. The temperature-controlled enclosure 100 is illustrated as a cube shape, but the temperature-controlled enclosure 100 may be any three-dimensional shape, for example, a rectangular prism, pyramid, or spherical shape. In various embodiments, the temperature-controlled enclosure 100 may be the same three-dimensional shape as the temperature-controlled shipper 1300. In various other embodiments, the temperature-controlled enclosure 100 may be a different three-dimensional shape than the temperature-controlled shipper. In various embodiments, one or more brackets 400 may be coupled to the outer rim 800. The temperature-controlled enclosure 100 may have two brackets 400 attached at opposite corners of the outer rim 800. In various embodiments, the temperature-controlled enclosure 100 may have a bracket 400 coupled at each corner, wherein there are four brackets 400.

Figure 4:
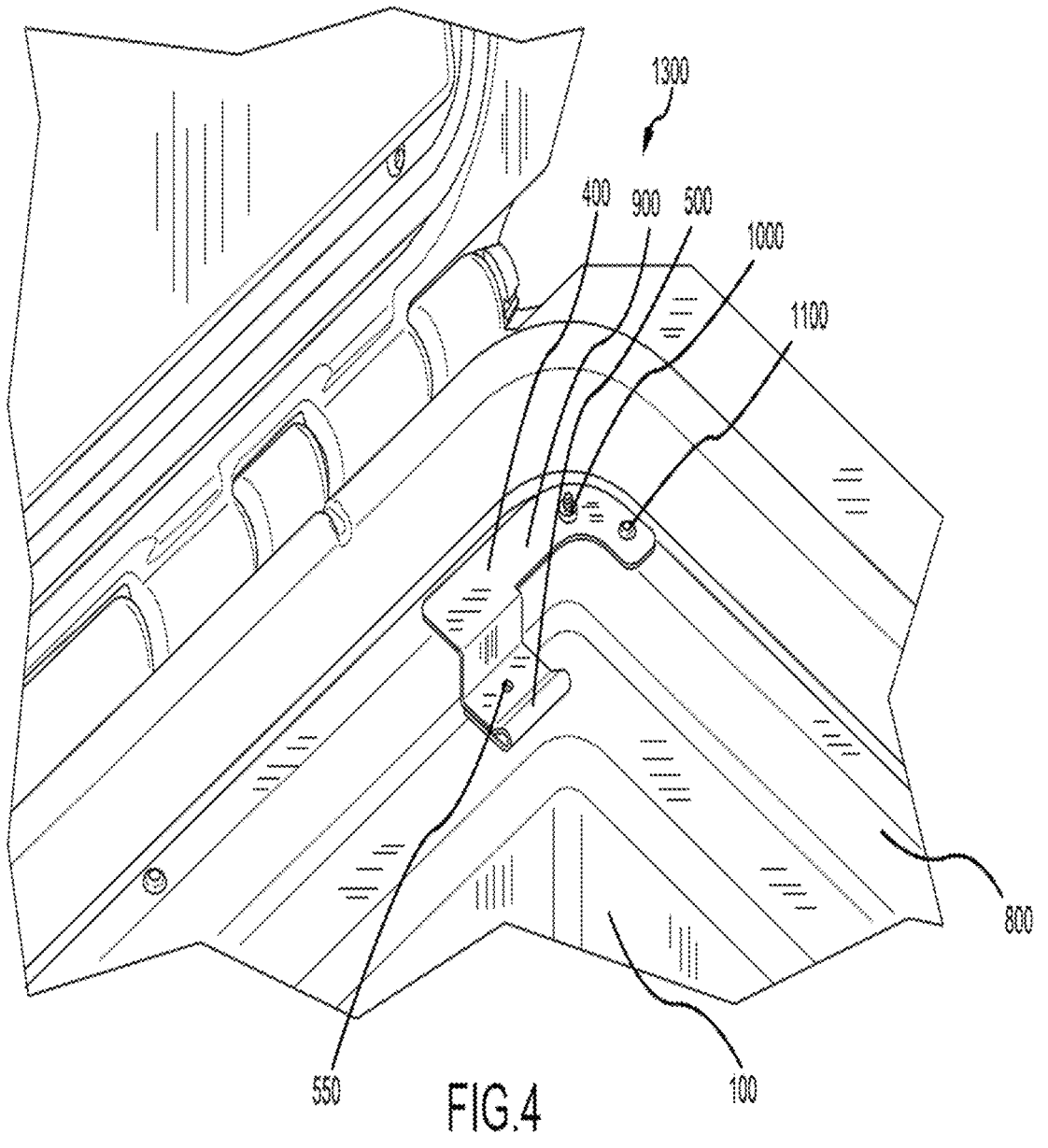
FIG. 4 illustrates a zoomed-in view of one of the brackets coupled to the outer rim of the temperature-controlled enclosure shown in FIG. 3, in accordance with various embodiments.
Figure 5:
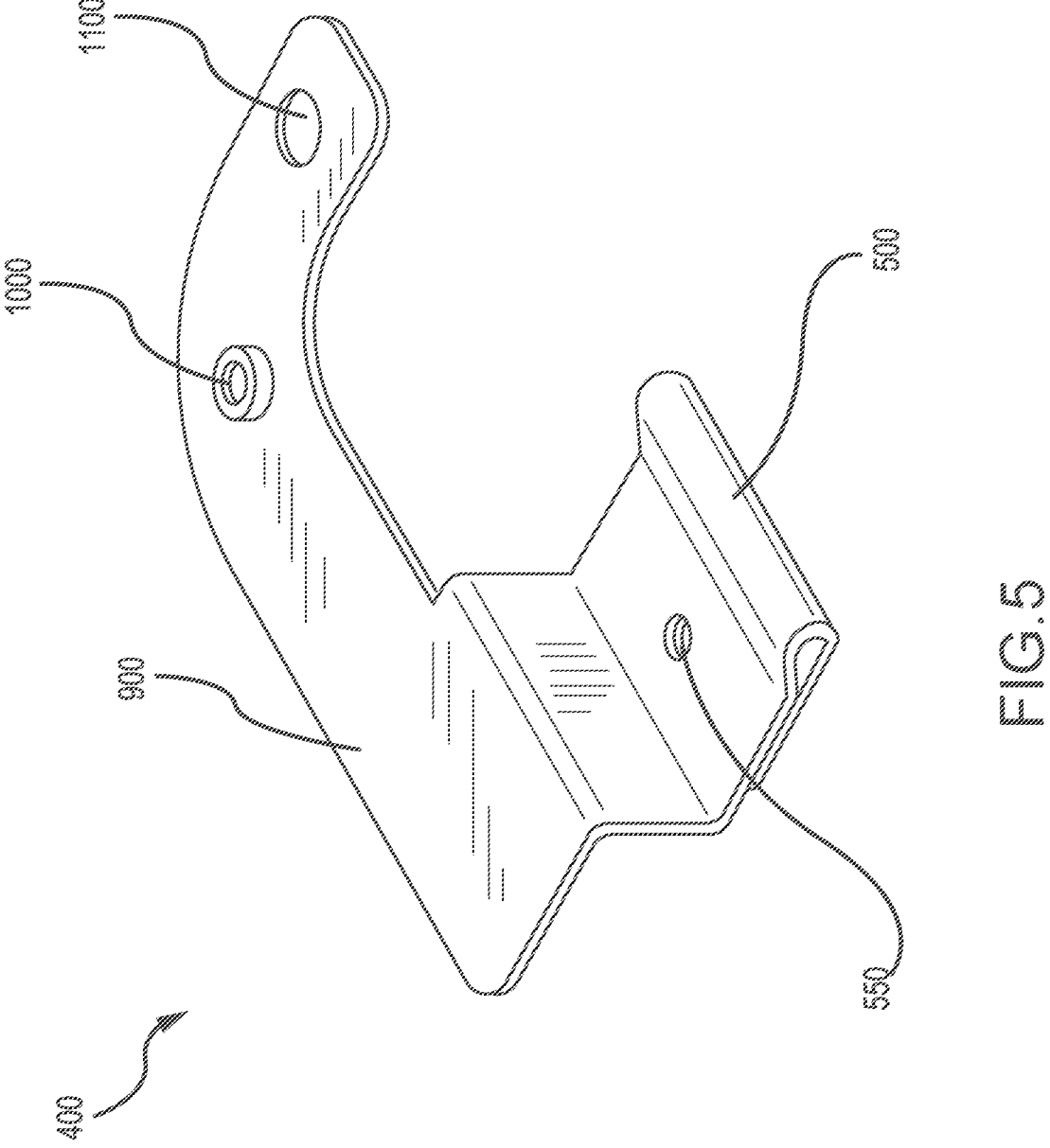
FIG. 5 illustrates a perspective view of a bracket, in accordance with various embodiments.

Referring now to FIGS. 4 and 5, a detailed view is provided showing a bracket coupled to a temperature-controlled enclosure 100 in FIG. 4 and a detailed view of the bracket is shown in FIG. 5. In various embodiments, the bracket 400 may comprise a securing loop 500, a main body 900, a first aperture 1000 and a second aperture 1100. The bracket 400 may be made from a metal. The main body 900 can comprise one or more flanges. The flanges can be flat or bent up or down to fit to a temperature-controlled enclosure 100. The flanges may each comprise one flat surface, or the flanges may each comprise two or more flat surfaces. The securing loop 500 may be a unitary piece of the bracket 400, wherein the metal is bent to form a loop and spot welded to the bracket 400 to form a securing loop spot weld 550. To resist tampering, the bracket may be securely coupled to the temperature-controlled enclosure. The main body 900 of the bracket 400 may have two apertures through it, a first aperture 1000 and a second aperture 1100. In various embodiments, the first aperture 1000 may receive a fastener, such as a bolt and nut, and the second aperture 1100 may receive a fastener, such as a machine screw. In various embodiments, the fastener comprises a fastener with a shaft and a head, wherein the head is concealed to ameliorate tampering. In various embodiments, the fastener is a machine screw that may be externally irreversible because it cannot be unthreaded or unsecured from the external surface of the temperature-controlled enclosure 100. The nut may be securely coupled through the first aperture 1000 using a bolt that is threaded into the nut through the first aperture 1000.

In various embodiments, the first aperture 1000 and the second aperture 1100 are both configured to securely couple the bracket 400 to the temperature-controlled enclosure 100. The first aperture 1000 and the second aperture 1100 may offer a primary means of securing the bracket to the temperature-controlled enclosure 100, and a secondary means of securing the bracket to the temperature-controlled enclosure 100. With redundant means of securing, the bracket 400 may function better to resist tampering.

Although illustrated as comprising two apertures, the present disclosure is not limited in this regard. For example, the first aperture 1000 and second aperture 1100 may house alternate means of securing the bracket 400, for example an adhesive or multiple machine screws, or multiple nuts. In various embodiments, there may only be one aperture. In various embodiments, there may be more than two apertures. In other embodiments, the means for securing the bracket 400 to the temperature-controlled enclosure 100 may not require any apertures.

Figure 6:
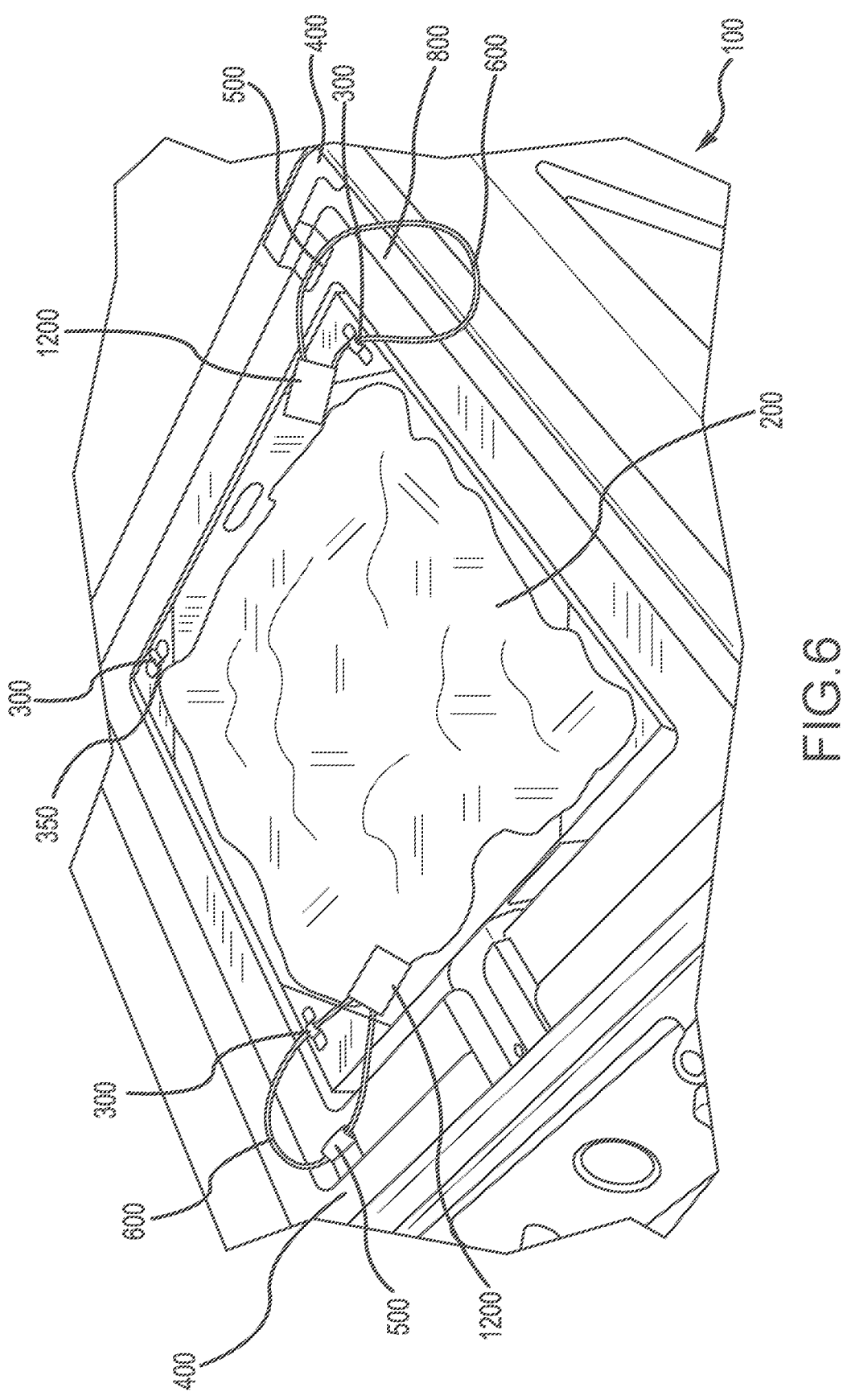
FIG. 6 perspective view of a temperature-controlled shipper wherein a tray filled with phase-change material is placed in the temperature-controlled enclosure and coupled to the temperature-controlled enclosure using tamper-resistant ties, in accordance with various embodiments.

With reference now to FIG. 6, in various embodiments the tray 200 may be configured to fit into the temperature-controlled enclosure 100. The tray 200 may hold a phase-change material, a cryogen, and/or another heat-sinking article or substance. For example, the tray 200 may hold dry ice. In various embodiments, each of the receiving loops 300 may align or be in proximity to a corresponding securing loop 500 when the tray 200 is fit in the temperature-controlled enclosure 100. Once the receiving loops 300 are in proximity to the brackets 400 comprising the securing loops 500, one or more tamper-resistant ties 600 may be inserted through a passageway 350 of a receiving loop 300, and a securing loop 500. The tamper-resistant ties 600 may be metal zip-ties. The tamper-resistant ties 600 may comprise fastening tags 1200 to secure the tamper-resistant ties. The fastening tags 1200 may contain a sensor to alert a user remotely if the tamper-resistant tie 600 is tampered with or otherwise experiences abnormal conditions. In various embodiments, the fastening tag 1200 may be a tag with an identifying serial number. In various embodiments, a user may be notified via a smartphone or computer. The tamper-resistant ties 600 may further contain GPS location tracking devices, RFID capabilities, and audio alarm systems.

Referring now to FIG. 7, in various embodiments, a method 1500 for shipping or storing a payload requiring cryogenic shipment or storage is illustrated. A user may prepare the payload and place the payload in the temperature-controlled enclosure of a temperature-controlled shipper (block 1502). The user may then place a tray in the temperature-controlled enclosure, wherein the tray comprises one or more securing loops (block 1504). The tray may be configured to fit into the temperature-controlled enclosure on top of the payload wherein the placement of the tray restricts access to the payload. The user may then loop one or more tamper-resistant ties through each of the securing loops and the corresponding receiving loops, then secure the tamper-resistant ties (block 1506). Then, the user may fill the tray with phase-change material, such as dry-ice (block 1508). The user may close the lid (block 1510). In various embodiments, the method may further comprise shipping or storing the temperature-controlled shipper and monitoring the sensor or other alerting technology integrated in the tamper-resistant ties.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system to resist tampering with cargo in a temperature-controlled enclosure, comprising:
   a temperature-controlled enclosure;
   a tray comprising one or more receiving loops configured to fit in the temperature-controlled enclosure;
   one or more brackets comprising one or more securing loops each corresponding to each of the one or more receiving loops; and
   one or more tamper-resistant ties,
   wherein the one or more brackets are coupled to the temperature-controlled enclosure, and each of the one or more tamper-resistant ties loop through at least one of the one or more receiving loops and at least one of the one or more securing loops.

2. The system according to claim 1, wherein the one or more brackets coupled to the temperature-controlled enclosure are coupled by at least one fastener, wherein the at least one fastener comprises a fastener with a shaft and a head, wherein the head is concealed to further impede or discourage tampering.

3. The system of claim 1, wherein the temperature-controlled enclosure is cube-shaped.

4. The system of claim 2, wherein the one or more brackets is secured to an outer rim of the temperature-controlled enclosure using one or more externally irreversible machine screws.

5. The system of claim 2, wherein the one or more brackets are secured to an outer rim of the temperature-controlled enclosure by welding.

6. The system of claim 1, wherein the one or more securing loops are coupled to the temperature-controlled enclosure by coupling the one or more brackets, each comprising a securing loop and a coupling aperture, to an outer rim of the temperature-controlled enclosure.

7. The system of claim 1, wherein the one or more tamper-resistant ties are made of steel.

8. The system of claim 1, wherein the one or more tamper-resistant ties have communication and monitoring capabilities, such as RFID, GPS and tampering sensors.

9. The system of claim 1, wherein the one or more receiving loops are metal loops welded to the tray.

10. The system of claim 1, wherein the one or more receiving loops are metal loops integrally formed unitarily with the tray from a same piece of material as the tray.

11. The system of claim 1, wherein the one or more receiving loops comprise one or more apertures defined through at least a portion of the tray.

* * * * *